March 5, 1946.    C. R. NISEWANGER ET AL    2,395,902
ELECTRONIC CHRONOSCOPE FOR MEASURING RATES OF DETONATION
Filed Feb. 27, 1945
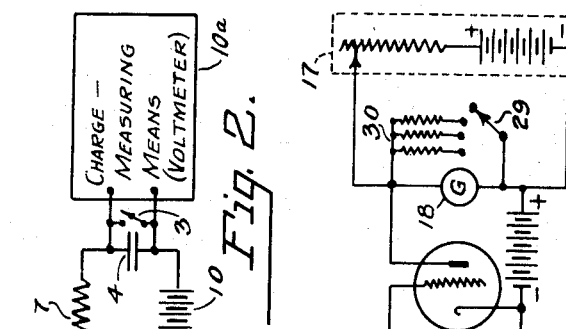
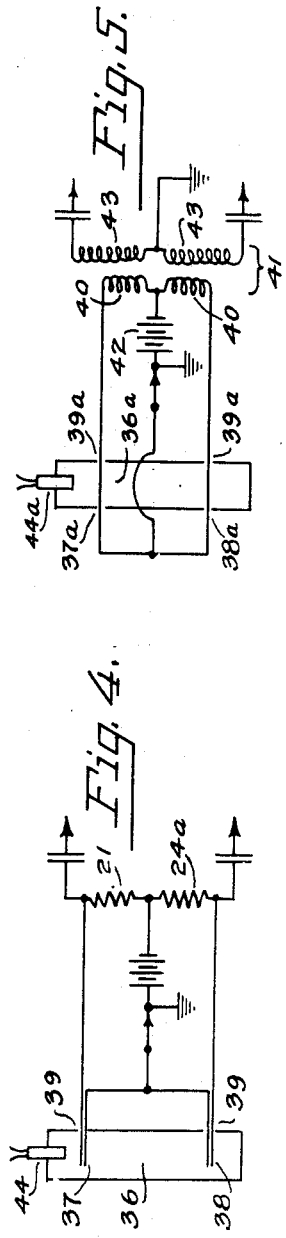
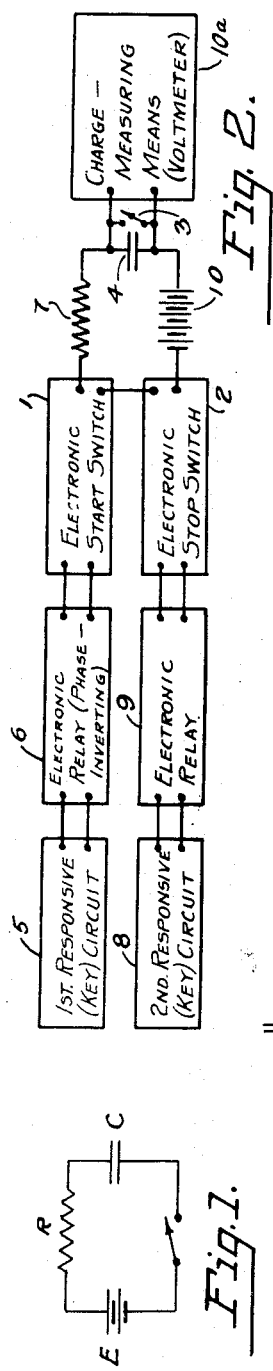
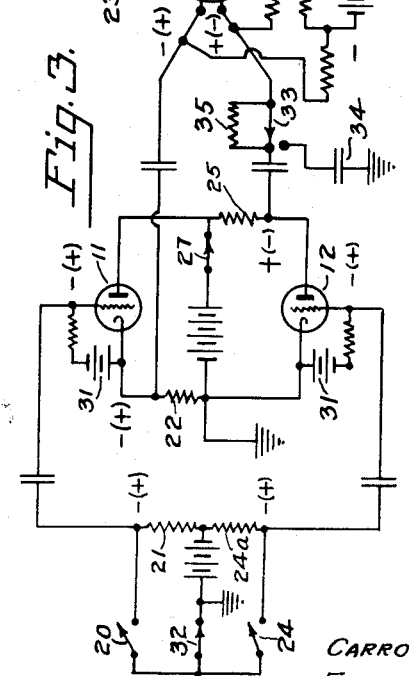
CARROL R. NISEWANGER
FREDERICK W. BROWN
INVENTORS
BY *J. F. Muirhead*
ATTORNEY Patented Mar. 5, 1946

2,395,902

UNITED STATES PATENT OFFICE 2,395,902

ELECTRONIC CHRONOSCOPE FOR MEASURING RATES OF DETONATION

Carrol R. Nisewanger and Frederick W. Brown, Pittsburgh, Pa., assignors to the Government of the United States, as represented by the Secretary of the Department of the Interior Application February 27, 1945, Serial No. 580,055

12 Claims. (Cl. 161—15)

(Granted under the act of March 3, 1883, as amended April 30, 1928; 370 O. G. 757)

The invention described herein may be manufactured or used by or for the Government of the United States for governmental purposes without payment of any royalty thereon.

This invention relates to electronic chronoscopes particularly but not exclusively adapted for measuring rates of detonation of explosive charges and aims generally to improve the same. To this end the invention provides improved apparatus operating in accordance with the improved method also comprised within the scope of the invention.

In studying the performance of ammunition it is desirable to be able to determine the rates of detonation of explosive charges of small dimensions. Also, fundamental studies of initiation of detonation in explosives require the determination of rates of detonation over small distances. Such studies necessitate the use of an instrument capable of measuring very short time intervals. For example, if a rate of 6000 meters per second is to be determined by measurement over a distance of 6 centimeters, an instrument capable of measuring a time interval of $10^{-5}$ seconds is required.

There are at present three standard methods of measuring rate of detonation:

(1) D'Autriche method.
(2) Rotating drum chronograph methods.
(3) Photographic methods.

The D'Autriche method is not very precise, especially for small time intervals. The rotating drum chronograph methods are accurate for comparatively large time intervals but are not applicable to measurement of time intervals as low as $10^{-5}$ seconds. Photographic methods depend on luminosity of products of explosion and are not therefore applicable to measurement of rates of cased charges. None of these methods is direct reading.

Several electronic chronoscopes have been developed for various purposes such as the measurement of velocities of projectiles or vehicles. However, none of these instruments is adapted to measure time intervals as short as those encountered in measuring rates of detonation of explosives.

High speed oscillographic methods have been developed for measuring transient phenomena of a few microseconds duration such as lightning discharges. Such methods might be made applicable to measurement of rates of detonation, but they do not have the desired characteristics of simplicity and easy portability and are not direct reading.

A laboratory method for measuring rates of detonation over distances of one to two centimeters has been described in the literature. The electronic circuit employed uses a very sensitive ballistic galvanometer which makes the apparatus non-portable and rather fragile. A similar circuit using a vacuum tube voltmeter instead of a ballistic galvanometer did not give satisfactory operation.

After a careful study of both the theoretical and practical aspects of various types of time measuring devices it was decided that the existing systems did not offer a solution to the problem, and the present invention was accordingly made to provide an electronic chronoscope employing the time-voltage relationship of a series resistance-capacitance circuit in a manner to impart to the chronoscope the necessary characteristics.

Among the objects of the invention severally and in various combinations are (1) the provision of a method and means adapted to measurement of rates of detonation of both cased and unconfined charges; (2) the provision of a method and means of the type described applicable to either field or laboratory measurement; (3) the provision of a method and means of the type described having a precision of plus or minus 5% for time intervals at least as short as $\frac{1}{100000}$ of a second and preferably adapted to measurement of time intervals as high as a millisecond; (4) the provision of a device and method of the type described adapted to give direct indication of the time interval; (5) the provision of features and arrangements contributing respectively and collectively to dependability, simplicity and safety of operation, ruggedness and portability.

Other objects and advantages of the invention will be apparent from the following description of preferred embodiments illustrative of the principles thereof.

In the accompanying drawing of such illustrative embodiments:

Fig. 1 is a simplified diagram of a resistance-capacitance circuit.

Fig. 2 is a block diagram of a basic circuit according to the present invention.

Fig. 3 is a circuit diagram of a complete system according to the invention.

Fig. 4 is a diagram showing the preferred manner of closing control circuits in response to propagation of a detonation.

Fig. 5 is a diagram showing a manner of open ing control circuits in response to propagation of a detonation.

As above noted, the present invention employs the time voltage relationship of a series resistance-capacitance circuit such as shown in Fig. 1. As is well known, when a capacitance C, Fig. 1, is charged through a series resistance R by a battery E, the time-voltage relation is expressed by the equation $$t = -RC \log_e \left(1 - \frac{V}{E}\right)$$

where $t$=time in seconds, R=resistance in ohms, C=capacitance in farads, V=potential of the condenser in volts, E=E. M. F. of the battery in volts, and $e$=base of natural logarithms.

The present chronoscope, as indicated diagrammatically in Fig. 2 consists of a series resistance-capacitance circuit 7, 4, a source of E. M. F., 10, a voltmeter for measuring the potential of the capacitance, and electronic switches for closing the circuit at the beginning of the time interval to be measured and for opening the circuit at the end of the time interval, which electronic switches are controlled by electronic relays. Thus as diagrammatically shown in Fig. 2, the circuit is caused to operate as follows: electronic switch 2 is closed and switch 1 is open, switch 3 bridging the condenser is closed momentarily to discharge the condenser 4 and is then opened. At the beginning of the time interval to be measured switch 5 illustrated as a key is closed, operating the electronic relay 6 which closes electronic switch 1, completing the resistance-capacitance circuit and current flows through the resistance 7 charging the condenser 4. At the end of the time interval the switch or key 8 is closed and electronic relay 9 is operated opening the switch 2 and stopping the current in the resistance-capacitance circuit. The potential of the condenser is read on a suitable voltmeter 10a preferably of the form herein described and is a measure of the time interval.

In the preferred embodiment of the invention shown in Fig. 3, thyratrons 11 and 12 are employed as relays and a multigrid vacuum tube performs the electronic switching functions of the switches 1, 2, a vacuum tube voltmeter being employed to read the voltage of the condenser.

In this preferred form the grids of the thyratrons 11 and 12 are biased just below their critical control value so that not plate current flows. Grid 13 of the pentode electronic switching tube 14 is initially biased to cutoff, and grid 15 is at cathode potential. The grid of triod 16 is biased slightly negative so that minimum grid current will flow. This is accomplished by closing the shorting switch 19 thus connecting the grid to a negative point on the voltage divider and placing an initial negative charge on the condenser 23 which maintains the grid bias until current flows in the plate circuit of pentode 14. Any grid current in tube 16 while switch 19 is open will change the charge on the condenser 23 thus changing the grid bias and causing the meter to drift. It is therefore desirable to use a tube especially designed for low grid current and to adjust the initial grid bias to the optimum value in order to minimize drift. Hence either a triod or a tube having a greater number of elements may be used.

The grounded side of condenser 23 may be connected to the same point on the voltage divider as is switch 19 instead of to ground as shown. Still another variation is to connect the shorting switch to ground and to maintain the cathode of tube 16 slightly positive either by use of a resistor in the cathode circuit or by connecting the cathode to a slightly positive point on the voltage supply.

The quiescent plate current of the triod or other tube 16 is cancelled by the balancing circuit 17 so that the meter 18 reads zero. The shorting switch 19 arranged to discharge the condenser 23 through a suitable resistance which may be a portion of the B battery potentiometer as shown, is opened just before starting of the measurement. At the beginning of the time interval to be measured the key 20 is closed, causing an IR drop in the resistance 21 and transmitting a positive voltage pulse to the grid of thyratron 11 which initiates conduction in the thyratron circuit. The cathode current of the thyratron 11 causes an IR drop in the cathode leg resistance 22 making the grid 13 of pentode 14 positive with respect to its original voltage and causing the pentode 14 to conduct, charging the condenser 23 through the resistance of predetermined value 23a. At the end of the time interval the switch or key 24 is closed, producing an IR drop in resistance 24a which causes a positive voltage pulse to be applied to the grid of the thyratron 12. The thus initiated flow of current through the anode leg resistance 25 is applied to lower the voltage of grid 15 of pentode 14 to a value below cutoff to cause the pentode switching tube to stop conducting. The charge applied to the condenser 23 during the interval of conduction of tube 14 reduces the grid voltage of the triod 16 and decreases its plate current. The resulting change in current through the galvanometer 18 is then a measure of the time interval.

To reset the arrangement the thyratron circuits are opened momentarily as by quenching switch 27 and the condenser 23 is discharged as by closing switch 19.

The time interval range may be changed by any or all of several methods. A switch 28 may be provided for selecting various values of resistance 23a or a switch 29 may be employed to change the value of the meter shunt resistance 30, for example. The balancing circuit 17, Fig. 3, may be replaced by a resistance bridge circuit. The batteries except for battery 31 imparting the initial bias to the thyratron 11, may be replaced by a power supply circuit. In order to test the system for proper functioning a constant time interval generator is preferably incorporated in the circuit. Its preferred arrangement is as shown in Fig. 3. In this arrangement switch 32 is opened and keys 20 and 24 are held closed for the test or calibration. Switch 33 is then turned to the position connecting condenser 34 to grid 15 and also putting resistor 35 in series with grid 15. With these connections made, closing of switch 32 causes both thyratrons 11 and 12 to start conducting simultaneously. The resistance-capacitance circuit composed of resistor 35 and condenser 34 causes a delay in the voltage change of grid 15 so that tube 14 conducts for a brief interval and condenser 23 is charged to a corresponding voltage. This results in a certain reading of the meter 18. If the chronoscope is functioning properly the meter reading will be the same each time the test is made.

When the new electronic chronoscope of this invention is employed in measuring the rates of detonation of an explosive, two stations are established in the explosive charge a measured distance apart and the chronoscope is connected to these stations so that thyratron 11 is "ignited" when the detonation wave arrives at the first station and thyratron 12 is "ignited" when it arrives at the second station. The rate of detonation is then the distance between the stations divided by the time indicated on the chronoscope.

The chronoscope may be operated either by closing circuits or by opening circuits at the respective stations. Both modes of operation are useful in measuring rates of detonation under various conditions. The two systems are herein referred to as the "make" system and the "break" system, respectively.

Fig. 4 shows an illustrative embodiment of the "make" system. A small hole is drilled or punched with a needle through the charge 36 at each of the stations 37 and 38. Two small insulated wires 39, preferably cotton covered wires, are placed through each hole so that the wires are in close juxtaposition but do not make metallic contact. The wires from the first station 37 lead to input circuit of thyratron 11 and those from the second station to the input circuit of thyratron 12. When the detonation of the charge 36, initiated by the primer cap 44 occurs the ions produced in the reaction form a conducting medium completing the circuit between the paired wires 39 and operating the chronoscope. This principle of using the ions produced in the explosion to operate the chronoscope is believed to be a new feature of the present invention since so far as is known all previous devices have employed the breaking of wires.

When adapting the present invention to the wire "breaking" system an arrangement may be employed such as that shown in Fig. 5 in which a small wire 39a is placed through each of the holes 37a and 38a and connected in series with the primary 40 of a step-up transformer 41 and a 2-volt storage cell 42 as shown in Fig. 5. With this arrangement a current of about two amperes may flow in each circuit and when the wires 39a are broken by the explosion of the charge 36a initiated by the primer cap 44a, the voltage induced in the secondaries 43 ignites the thyratrons.

By using a relatively large initial current and a low voltage the effects of ionization are minimized and the resistance of the circuits when the wires break is high relative to the initial resistance so that the rate of change of current is relatively high producing an abrupt voltage rise in the grid circuits. Vacuum tube amplifiers may be employed instead of the step-up transformers, thus permitting the trigger circuits to be operated by smaller energy inputs.

The necessity of locating the chronoscope at a safe distance from the charge requires the use of transmission lines. For field work two-conductor parallel rubber covered No. 14 copper wire up to 300 feet long may be used. A permanent installation about 150 feet long may consist of two two-conductor twisted rubber covered No. 14 copper steel-sheathed cables in a trench. The sheath and one conductor of each cable are preferably grounded. However, any suitable length and type of transmission line may be employed.

As above mentioned, various changes may be made in the details of arrangement without departing from the present invention. As further examples of such changes we contemplate the employment of two vacuum tubes in series in lieu of a single pentode tube as the electronic tube means having its cathode and anode connected in the resistance-capacitance circuit and providing a stopping grid initially biased to permit flow of current through the tube and a starting grid initially biased to cutoff. Similarly we may employ trigger circuits in lieu of the thyratron circuits as the electronic means for changing the bias of the starting grid to initiate flow of current at the beginning of the time interval to be measured and as the electronic means for changing the bias of the stopping grid to stop the flow of current at the end of the time interval being measured.

From the foregoing description it will be apparent that in preferred embodiments of our invention we employ identical circuits for obtaining an electrical response to the detonation of an explosive charge or the like; apply such identical electrical responses to substantially identical electronic relay circuits, develop in said relay circuits control potentials for the electronic switches, obtain automatic phase inversion of one of the voltages applied thereto relative to the other by arrangement of the load resistance respectively in the cathode and anode sides of the relay circuits; and apply the said potentials to start and stop the flow of current in the resistance capacitance circuit by inertialess electronic switching. The auxiliaries such as the circuit testing arrangement 32—35, the quenching and discharging switches 27 and 19, and the scale adjusting arrangements 28–30 are clearly subject to rearrangement or omission without departing from this invention. In the preferred embodiment shown in Fig. 3 the electrically responsive circuits are coupled to the relay circuits electrostatically and similar coupling is employed between the relay circuits and the electronic switch grid circuits.

Having described the preferred embodiments of our invention illustrative of the same, we claim:

1. In an electronic chronoscope system for measuring rates of detonation of explosive charges, a starter keying circuit electrically responsive to propagation of an explosion through a selected point in an explosive charge, an electronic relay circuit controlled by said keying circuit to produce an output charge on response of said keying circuit to the explosion, a resistance-capacitance circuit comprising a source of E. M. F. and an electronic switching means controlled by the output charge of said relay circuit for closing said resistance-capacitance circuit in response to operation of said keying circuit; a second keying circuit electrically responsive to propagation of the explosion through a second selected point in the explosive charge, a second electronic relay circuit controlled by said second keying circuit to produce an output charge on response of said second keying circuit to the explosion, said resistance-capacitance circuit including an electronic switching means for opening said resistance-capacitance circuit and controlled by the output charge of said second relay circuit; and means for measuring the charge imparted to the capacitance of said resistance-capacitance circuit during the interval between closing and opening of said circuit, as an indication of the rate of detonation of the charge between the two selected points therein.

2. A system according to claim 1, in which said keying circuits each comprise juxtaposed conductors out of electrical contact with one another to be inserted into the charge at the selected point, so that the keying circuit is completed between said conductors by the ionized products of combustion of the charge.

3. A system according to claim 1, in which said keying circuits each comprise a conductor to be inserted into the charge at the selected point and to be interrupted on combustion of the charge, said conductors respectively establishing flow of current through the primary of an associated transformer and interrupting said flow of current therein on explosion of the charge, and said associated transformers having their secondaries connected to apply charges resulting from interruption of their primary circuits, to control the electronic relay circuits respectively.

4. In an electronic chronoscope system for measuring rates of detonation of an explosive charge or the like, a starter keying circuit comprising juxtaposed conductors out of electrical contact with one another, said conductors in use being inserted into the charge at a given point, said arrangement providing for completion of the circuit between said conductors by ionization products of the combustion of the charge.

5. In an electronic chronoscope or the like, means for obtaining an electrical response to the detonation of an explosive charge comprising a conductor having an open-circuit juxtapositioned to the explosive charge and adapted to be closed by the ionized products of combustion of the charge.

6. In electronic chronoscopy and the like, the method of obtaining an inertialess electronic response to the detonation of an explosive charge which consists in employing the ionization products of the explosion as a conductor to close a circuit between conductive terminals located in juxtaposition to the charge.

7. An electronic chronoscope system for measuring a time interval initiated and terminated by changes of conditions capable of producing electrical responses, said system comprising means for detecting each change of conditions, electronic relay circuits controlled by said respective detecting means, a time integrating circuit, electronic switching elements connected in series in said time integrating circuit and respectively controlled by said relay circuits for initiating and stopping flow of current therein in response to operation of said respective detecting means, and means for measuring the time integrating factor of said time integrating circuit as a measure of the time elapsing between the operation of said respective detecting means.

8. In an electronic chronoscope a resistance-capacitance circuit controlled by electronic switching means, and two separate electronic relay circuits respectively operable in response to the beginning and ending of the time interval to be measured and connected to independently bias elements of said electronic switching means to initiate and terminate flow of current in said resistance-capacitance circuit, whereby said circuit may measure time intervals less than the operating time of one of the relay circuits.

9. In an electronic chronoscope, a resistance-capacitance circuit, electronic tube means having its cathode and anode connected in said circuit and having a stopping grid initially biased to permit flow of current through the tube and a starting grid initially biased to cut off such flow of current, electronic means for changing the bias of said starting grid to initiate flow of current at the beginning of the time interval to be measured, electronic means for changing the bias of said stopping grid to stop the flow of current at the end of the time interval being measured, and means for measuring the charge imparted to the capacitance in the resistance-capacitance circuit by the flow of current during said time interval which, by the time-voltage relationship of the resistance-capacitance circuit reflects and thus indicates the time of current flow therein.

10. In an electronic chronoscope a resistance-capacitance circuit; electronic means for closing and opening said circuit comprising two control elements, the first of said control elements being initially biased to cut off and the second being initially biased to pass current in the circuit; independently operable electronic relays respectively connected to change the bias of said first control element to initiate flow of current in said resistance-capacitance circuit at the beginning of the time interval to be measured, and to change the bias of said second control element to cut off flow of current in said resistance-capacitance circuit at the end of said time interval, and means for measuring the charge imparted to the capacitance of said resistance-capacitance circuit by the current flowing in said time interval.

11. In an electronic chronoscope embodying the combination of claim 8, a testing and calibrating arrangement comprising means connectable for simultaneously closing said two separate electronic relay circuits, and means connectable for producing a predetermined time delay in the output of the relay circuit connected to terminate flow of current in the resistance-capacitance circuit.

12. A system according to claim 1, in which said keying circuits each comprise a conductor to be inserted into the charge at the selected point and to be interrupted on combustion of the charge, said conductors respectively establishing flow of current through associated circuits and interrupting said flow of current on explosion of the charge and said associated circuits being connected to apply charges resulting from interruption of said conductors to control the electronic relay circuits respectively.

CARROL R. NISEWANGER.
FREDERICK W. BROWN.